United States Patent
Ishii et al.

(10) Patent No.: US 12,278,890 B2
(45) Date of Patent: Apr. 15, 2025

(54) DATA RECORDING APPARATUS, DATA RECORDING METHOD, RECORDING MEDIUM HAVING RECORDED THEREON DATA RECORDING PROGRAM, SYSTEM, METHOD, AND RECORDING MEDIUM HAVING RECORDED THEREON PROGRAM

(71) Applicant: Yokogawa Electric Corporation, Tokyo (JP)

(72) Inventors: Yosuke Ishii, Tokyo (JP); Tomohiro Kuroda, Tokyo (JP); Hiroaki Kanokogi, Tokyo (JP); Yota Furukawa, Tokyo (JP); Shugo Sakatani, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 245 days.

(21) Appl. No.: 17/691,124

(22) Filed: Mar. 10, 2022

(65) Prior Publication Data

US 2022/0200790 A1    Jun. 23, 2022

Related U.S. Application Data

(63) Continuation of application No. PCT/JP2021/007121, filed on Feb. 25, 2021.

(30) Foreign Application Priority Data

Feb. 27, 2020    (JP) .................................. 2020-032064

(51) Int. Cl.
*G06F 21/62* (2013.01)
*G05B 19/418* (2006.01)
(Continued)

(52) U.S. Cl.
CPC .......... *H04L 9/0819* (2013.01); *H04L 9/3239* (2013.01); *H04L 9/50* (2022.05)

(58) Field of Classification Search
None
See application file for complete search history.

(56) References Cited

U.S. PATENT DOCUMENTS

2005/0166057 A1*  7/2005  Kanai ................... H04L 9/3263
713/176
2009/0099967 A1*  4/2009  Yokota ................... H04L 9/083
380/282

(Continued)

FOREIGN PATENT DOCUMENTS

CN      109886429 A     6/2019
JP      2009540709 A    11/2009
(Continued)

OTHER PUBLICATIONS

Office Action issued for counterpart Japanese Application No. 2020-032064, issued by the Japanese Patent Office on Oct. 25, 2022 (drafted on Oct. 20, 2022).

(Continued)

*Primary Examiner* — Christopher B Robinson

(57) ABSTRACT

Provided is a data recording apparatus including a key exchange unit for exchanging a first encryption key with a system in response to authentication by the system, a data collection unit for collecting measurement data obtained by measuring a physical quantity associated with a measurement target, a data recording unit for recording the measurement data, and a data transmission unit for transmitting the measurement data encrypted using the first encryption key to the system. In addition, provided is a system including a key management unit for exchanging a first encryption key with a data recording apparatus in response to authentication of the data recording apparatus, a data obtaining unit (Continued)

for obtaining measurement data obtained by measuring a physical quantity associated with the measurement target encrypted by the data recording apparatus using the first encryption key, and a data management unit for managing the measurement data using a distributed ledger technology.

20 Claims, 9 Drawing Sheets

(51) Int. Cl.
　　　*H04L 9/08*　　　(2006.01)
　　　*H04L 9/32*　　　(2006.01)
　　　*H04L 9/00*　　　(2022.01)

(56) References Cited

U.S. PATENT DOCUMENTS

| | | | |
|---|---|---|---|
| 2009/0268909 A1 | 10/2009 | Girao | |
| 2012/0182939 A1 | 7/2012 | Rajan | |
| 2015/0242481 A1* | 8/2015 | Hasegawa | G06F 16/951 707/623 |
| 2016/0352730 A1* | 12/2016 | Spagnola | H04L 63/0823 |
| 2017/0262862 A1 | 9/2017 | Aljawhari | |
| 2018/0097886 A1 | 4/2018 | Inoue | |
| 2018/0285810 A1 | 10/2018 | Ramachandran | |
| 2019/0339675 A1* | 11/2019 | Maeda | G05B 19/4183 |
| 2019/0354966 A1 | 11/2019 | Himura | |
| 2020/0043000 A1* | 2/2020 | Unagami | H04L 9/3247 |
| 2021/0058242 A1* | 2/2021 | Donsomsakunkij | G06F 21/602 |
| 2021/0144195 A1 | 5/2021 | Takahashi | |

FOREIGN PATENT DOCUMENTS

| | | |
|---|---|---|
| JP | 2014508442 A | 4/2014 |
| JP | 2019524013 A | 8/2019 |
| JP | 2019200580 A | 11/2019 |
| WO | 2016157271 A1 | 10/2016 |
| WO | 2019176080 A1 | 9/2019 |
| WO | 2019193823 A1 | 10/2019 |

OTHER PUBLICATIONS

International Search Report and (ISA/237) Written Opinion of the International Search Authority for International Patent Application No. PCT/JP2021/007121, issued/mailed by the Japan Patent Office on Jun. 2, 2021.

Dong Xueying et al., "A Traceability 1-14 Method Based on Blockchain and Internet of Things" 2019 IEEE Intl Conf on Parallel &Di stri but ed Processing With Applications, Big Data &Cloud Computing, Sustainable Computing&Communications, Social Computing & Networking (ISPA/BDCloud/Socialcom/Sustaincom), IEEE, Dec. 16, 2019 (Dec. 16, 2019), pp. 1511-1518, XP033745605,DOI:10.1109/ISPA-BDCLOUD-SUSTAINCOM-SOCIALCOM4.

Office Action issued for counterpart Japanese Application No. 2020-032064, issued by the Japan Patent Office on May 10, 2022 (drafted on Apr. 28, 2022).

Office Action issued for counterpart Chinese Application 202180017299. X, issued by The State Intellectual Property Office of People's Republic of China on Feb. 28, 2025.

* cited by examiner

DATA RECORDING APPARATUS, DATA RECORDING METHOD, RECORDING MEDIUM HAVING RECORDED THEREON DATA RECORDING PROGRAM, SYSTEM, METHOD, AND RECORDING MEDIUM HAVING RECORDED THEREON PROGRAM

The contents of the following Japanese patent application(s) are incorporated herein by reference:
NO. 2020-032064 filed in JP on Feb. 27, 2020
NO. PCT/JP2021/007121 filed in WO on Feb. 25, 2021

BACKGROUND

1. Technical Field

The present invention relates to a data recording apparatus, a data recording method, a recording medium having recorded thereon a data recording program, a system, a method, and a recording medium having recorded thereon a program.

2. Related Art

In patent literature 1, it is described that "in order to provide an infrastructure in which data can be recorded, shared, and verified while privacy and security of the data are maintained, a system where an IoT concept is applied to a food system by using a blockchain, a method, and a computer program product are provided".

CITATION LIST

Patent Literature

Patent Literature 1: U.S. Patent Application Publication No. 2018/0285810

GENERAL DISCLOSURE

According to a first aspect of the present invention, a data recording apparatus is provided. The data recording apparatus may include a key exchange unit configured to exchange a first encryption key with a system in response to authentication by the system. The data recording apparatus may include a data collection unit configured to collect measurement data obtained by measuring a physical quantity associated with a measurement target. The data recording apparatus may include a data recording unit configured to record the measurement data. The data recording apparatus may include a data transmission unit configured to transmit the measurement data encrypted using the first encryption key to the system.

The key exchange unit may be configured to exchange a second encryption key with equipment that is capable of obtaining the measurement data, and the data collection unit may be configured to collect the measurement data encrypted by the equipment using the second encryption key.

The second encryption key may be the same as the first encryption key.

The data transmission unit may be configured to transmit identification information for identifying its own apparatus to the system together with the measurement data encrypted using the first encryption key.

The system may be configured to manage the measurement data using a distributed ledger technology.

According to a second aspect of the present invention, a data recording method is provided. The data recording method may include exchanging a first encryption key with a system in response to authentication by the system. The data recording method may include collecting measurement data obtained by measuring a physical quantity associated with a measurement target. The data recording method may include recording the measurement data. The data recording method may include transmitting the measurement data encrypted using the first encryption key to the system.

According to a third aspect of the present invention, a recording medium having recorded thereon a data recording program is provided. The data recording program may be executed by a computer. The data recording program may cause the computer to function as a key exchange unit configured to exchange a first encryption key with a system in response to authentication by the system. The data recording program may cause the computer to function as a data collection unit configured to collect measurement data obtained by measuring a physical quantity associated with a measurement target. The data recording program may cause the computer to function as a data recording unit configured to record the measurement data. The data recording program may cause the computer to function as a data transmission unit configured to transmit the measurement data encrypted using the first encryption key to the system.

According to a fourth aspect of the present invention, a system is provided. The system may include a key management unit configured to exchange a first encryption key with a data recording apparatus in response to authentication of the data recording apparatus. The system may include a data obtaining unit configured to obtain measurement data obtained by measuring a physical quantity associated with the measurement target which is encrypted by the data recording apparatus using the first encryption key. The system may include a data management unit configured to manage the measurement data using a distributed ledger technology.

The system may further include a query reception unit configured to receive a query regarding the measurement target, and a query response unit configured to refer to the measurement data managed using the distributed ledger technology to respond to the query.

The query reception unit may be configured to receive a query for requesting disclosure of the measurement data associated with the measurement target, and the query response unit may be configured to transmit a response including the measurement data managed using the distributed ledger technology.

The query reception unit may be configured to receive a query for requesting an indicator of a value to be added to the measurement target, and the query response unit may be configured to transmit a response including the indicator of the value calculated based on the measurement data managed using the distributed ledger technology.

The query reception unit may be configured to receive a query for requesting an indicator of a consideration of the value added to the measurement target, and the query response unit may be configured to transmit a response including the indicator of the consideration calculated based on the measurement data managed using the distributed ledger technology.

According to a fifth aspect of the present invention, a method is provided. The method may include exchanging a first encryption key with a data recording apparatus in response to authentication of the data recording apparatus. The method may include obtaining measurement data obtained by measuring a physical quantity associated with the measurement target which is encrypted by the data recording apparatus using the first encryption key. The method may include managing the measurement data using a distributed ledger technology.

According to a sixth aspect of the present invention, a recording medium having recorded thereon a program is provided. The program may be executed by a computer. The program may cause the computer to function as a key management unit configured to exchange a first encryption key with a data recording apparatus in response to authentication of the data recording apparatus. The program may cause the computer to function as a data obtaining unit configured to obtain measurement data obtained by measuring a physical quantity associated with the measurement target which is encrypted by the data recording apparatus using the first encryption key. The program may cause the computer to function as a data management unit configured to manage the measurement data using a distributed ledger technology.

The summary clause does not necessarily describe all necessary features of the embodiments of the present invention. The present invention may be a sub-combination of the features described above.

DESCRIPTION OF EXEMPLARY EMBODIMENTS

Hereinafter, the present invention will be described by way of embodiments of the invention, but the following embodiments are not intended to limit the invention according to the claims. Not all combinations of features described in the embodiments are necessarily imperative to solving means of the invention.

Figure 1:
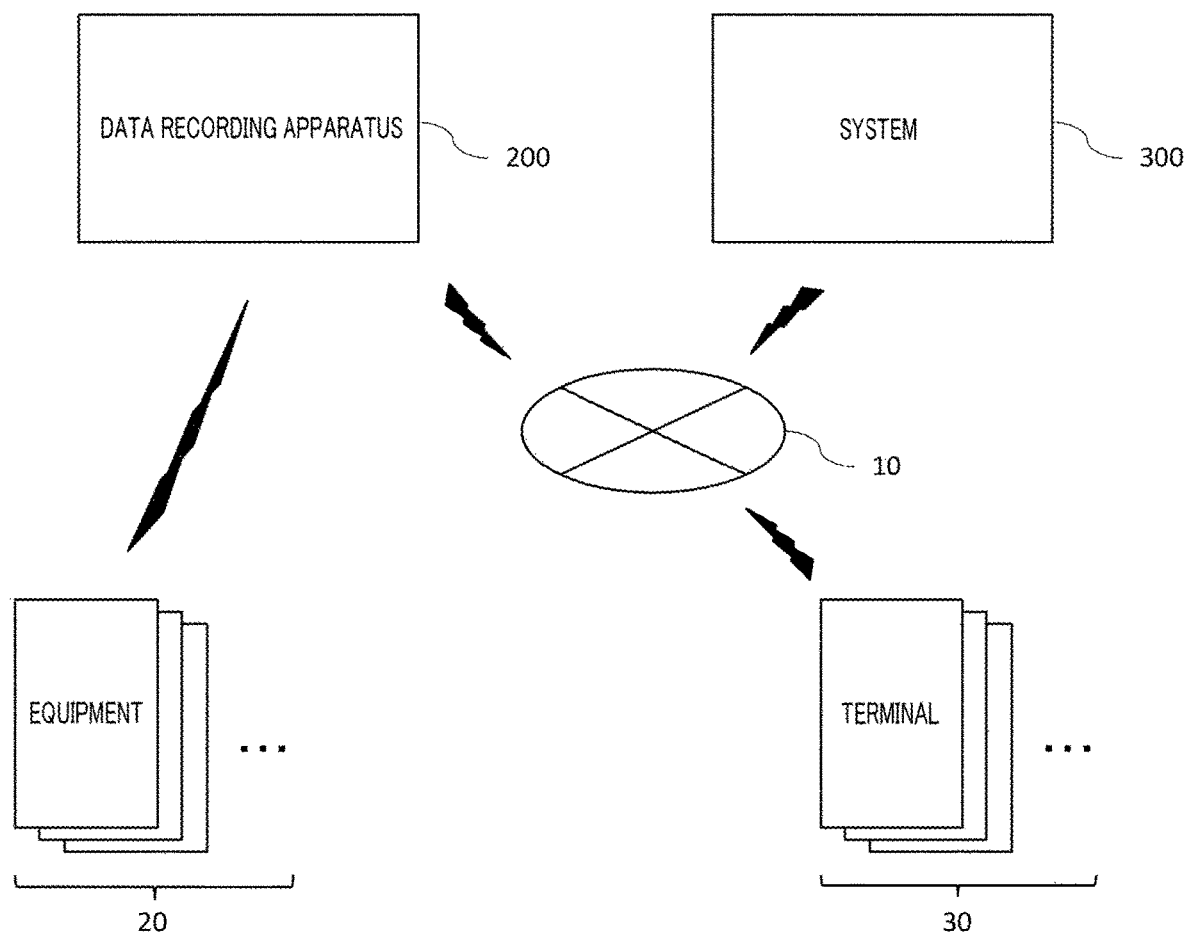
FIG. 1 illustrates a data recording apparatus 200 and a system 300 according to the present embodiment together with a communication network 10, equipment 20, and a terminal 30.

FIG. 1 illustrates a data recording apparatus 200 and a system 300 according to the present embodiment together with a communication network 10, equipment 20, and a terminal 30. In the present embodiment, the data recording apparatus 200 collects measurement data of the physical quantity associated with a measurement target which is obtained by the equipment 20 in a time series manner. Then, the data recording apparatus 200 encrypts the measurement data using an encryption key exchanged with the system 300 in response to authentication by the system 300, and transmits the encrypted measurement data to the system 300. The system 300 obtains the measurement data encrypted by the data recording apparatus 200 via, for example, the communication network 10 in a time series manner, and manages the encrypted measurement data by using a distributed ledger technology (DLT). In this manner, in the present embodiment, a novel approach is proposed in which a data logger that can securely record data and a DLT/blockchain (hereinafter also simply referred to as the DLT or the blockchain) are integrated with each other.

In the present embodiment, a case where the data recording apparatus 200 and the system 300 are applied to a food cold chain will be described as one example. Such a food cold chain is compatible with the technique according to the present embodiment since a nature of the measurement target changes in the mid-course (for example, a quality is decreased due to a temperature, a humidity, vibration, and the like during transportation and during storage), and also a large number of stakeholders are involved in the mid-course. However, the configuration is not limited thereto. The technique according to the present embodiment may be applied to other supply chain managements in which, for example, a nature of a measurement target changes in the mid-course such as medicine, crude oil, art objects, animals, and plants, and may be applied to another management different from the supply chain management.

The communication network 10 is a network configured to connect a plurality of computers to each other. For example, the communication network 10 may be a global network in which a plurality of computer networks are interconnected, and as one example, the communication network 10 may be the Internet using an Internet protocol or the like. Alternatively, the communication network 10 may be realized by a dedicated circuitry. The communication network 10 connects the terminal 30, the data recording apparatus 200, and the system 300 with each other.

The equipment 20 may be capable of obtaining measurement data obtained by measuring the physical quantity associated with a measurement target set as a management target by the system 300 (for example, products such as Japanese sake, wine, and frozen food). As one example, the equipment 20 may be an IoT sensor that can measure environment data of surrounding atmosphere of the measurement target, and may be, for example, a temperature sensor, a humidity sensor, a vibration sensor, and the like. In addition, for example, the equipment 20 may be a sheet-type sensor affixed to the measurement target and configured to obtain the environment data of surrounding atmosphere of the measurement target, and may be a compact sensor embedded in a label, a cap, a cork, or the like of a bottle.

In addition, as will be described below, the equipment 20 may be capable of exchanging a second encryption key with the data recording apparatus 200. Then, the equipment 20 may encrypt the measurement data obtained by the measurement by using the second encryption key, and transmit the encrypted measurement data to the data recording apparatus 200. Note that when the equipment 20 does not have a network communication function, the equipment 20 may transmit the measurement data to the data recording apparatus 200 via an edge/gateway or the like that is not illustrated in the drawing. In the present embodiment, a plurality of pieces of the equipment 20 that is capable of obtaining such measurement data may be connected to the data recording apparatus 200 in a wired or wireless manner.

The terminal 30 is a device used by a user as an input and output terminal such as a personal computer (PC), a smartphone, or a handy terminal. The user accesses necessary information via a Web browser, a business intelligence (BI) tool, dedicated application for the terminal, and the like operating on the terminal 30. In the present embodiment, a plurality of the terminals 30 described above may be connected to the system 300 via the communication network 10.

The data recording apparatus 200 is a secure data logger provided with a security function and a connection function to a distributed ledger technology. Specifically, the data recording apparatus 200 may be provided with a wired or wireless input and output (I/O) function for connecting to the plurality of pieces of equipment 20. Herein, a wired function may be, for example, signal transmission means such as a universal asynchronous receiver/transmitter (UART). In addition, a wireless function may be, for example, wireless communication means such as Bluetooth (registered trademark) low energy (LE), a non-contact tag (such as a radio frequency identifier (RFID or a near field communication (NFC)).

In addition, the data recording apparatus 200 may be provided with a data processing function for executing an analog-to-digital/digital-to-analog (AD/DA) conversion, data formatting, or the like. In addition, the data recording apparatus 200 may be provided with a database configured to record and store data. In addition, the data recording apparatus 200 may be provided with a data management function for executing data search, access management, or the like.

In addition, the data recording apparatus 200 may be provided with a security management function for executing user management for managing a user ID or a password, audit trail for storing information such as an operation record of the equipment and an error message in an unalterable state, cryptographic processing for encrypting and decrypting an electronic signature and data, and key management for managing a key for encrypting and decrypting the data.

In addition, the data recording apparatus 200 may be provided with a data viewer function for providing a user interface for the user who operates the data logger, and executing an operation and a setting of the equipment, display of a trend chart of the data, or the like. In addition, the data recording apparatus 200 may be provided with a DLT connection function having communication means (such as a wired LAN or a wireless LAN) or a network protocol (such as HTTP or FTP) for connecting to the distributed ledger technology. Details of the data recording apparatus 200 will be described below.

The system 300 realizes the application and a platform of the distributed ledger technology by software. The system 300 may be a computer such as a personal computer (PC), a tablet computer, a smartphone, a workstation, a server computer, or a general purpose computer, or may be a computer system in which a plurality of computers are connected to each other. The above-described computer system is also a computer in a broad sense. In addition, the system 300 may be implemented by one or more virtual computers that can be executed in the computer. Alternatively, the system 300 may be a dedicated computer that can realize the application and the platform of the distributed ledger technology, or may be a dedicated hardware realized by a dedicated circuitry. In addition, the system 300 may be implemented by a cloud computing or an on-premise server environment.

The application may have application for each stakeholder of the supply chain management. As one example, examples of the stakeholder of the food cold chain include a manufacturer, a wholesaler, a retail store, a transportation company, a consumer, and the like. Herein, the application for each stakeholder may have a dedicated function according to each work flow. For example, the application for consumers may have a function for specifying a product (measurement target) and displaying quality information on which the price of the product is to be based. At this time, a method of scanning a QR code (registered trademark) or the like may be employed as the method for specifying the product. In addition, various methods such as a method of displaying a scored quality and a method of displaying the presence or absence of a temperature deviation by using a trend chart may be employed as the method for displaying the quality information.

In addition, the application may have an added value calculation function for calculating and recording the added value to the product based on the data. As a method of calculating the added value, different methods may be used according to the type of target products or data. As one example, when a temperature management of a product volatile to a temperature change such as Japanese sake or wine is exemplified, an algorithm for "giving a negative added value corresponding to a time area during which temperature deviation has occurred" or "giving a higher added value to those having a smaller amount of temperature change" may be used. In addition, since it is also known that a quality of Japanese sake is affected by ultraviolet rays, the added value calculation may be reflected by a calculated value of the amount of exposure to ultraviolet rays, the presence or absence of measures for cutting ultraviolet rays, or the like.

In addition, the application may have a database that stores application for each of the above-mentioned stakeholders and data necessary for the added value calculation.

The platform may have a database provided with such features that the data is distributed and held in servers that are geographically away from each other, and the recorded data is not lost, and also the database continues operating even when some of the servers is hacked. The above-described database is characterized in that a unit of data storage called a block is generated at a certain time, and that it has a data verification model called a consensus algorithm (consensus building) that is held among servers. Representative implementation examples include techniques such as Ethereum and Hyperledger. In addition, examples of a consensus algorithm for ensuring anti-falsification of the data include techniques such as Proof of Work (PoW) and Proof of Authority (PoA). In the present embodiment, as the database of the platform, a database in which any of the above-described techniques is employed may be used.

In addition, the platform may have a smart contract function for automatically executing value exchange based on the added value calculation. Herein, the smart contract is a scheme for automatically executing a contract on the blockchain.

In addition, the platform may have a token/virtual currency exchange function for representing a value exchanged between the stakeholders as digital data such as a token or a crypto currency and circulating the token or the crypto currency when the added value calculated by the added value calculation function is automatically executed by the smart contract.

In addition, the platform may have a user management function for managing an ID of the user or apparatus that can access the system 300 and information such as passwords. In addition, the platform may have an authentication and authorization function for managing and controlling authentication of the user or apparatus, authorization of access to the data, and the like.

In addition, the platform may have a cryptographic processing engine configured to perform encryption and decryption of the data. At this time, for the cryptographic processing, cryptographic algorithms such as Advanced Encryption Standard (AES), Secure Hash Algorithm (SHA), Rivest-Shamir-Adleman cryptosystem (RSA), and Elliptic Curve Cryptography (ECC) may be used.

In addition, the platform may have a key management function for managing the key used for the cryptographic processing. Herein, the above-described key may be allocated to each of the data recording apparatuses 200, each of the terminals 30, or each of the users. At this time, a representative example of the key cryptography includes a public key cryptography method, and a technique such as a public key infrastructure (PKI) may be used as a method for managing a pair of a private key and a public key.

In addition, the platform may have an IoT equipment connection function for connecting to various pieces of equipment such as the data recording apparatus 200 via the communication network 10. Details of the system 300 will be also described below.

Figure 2:
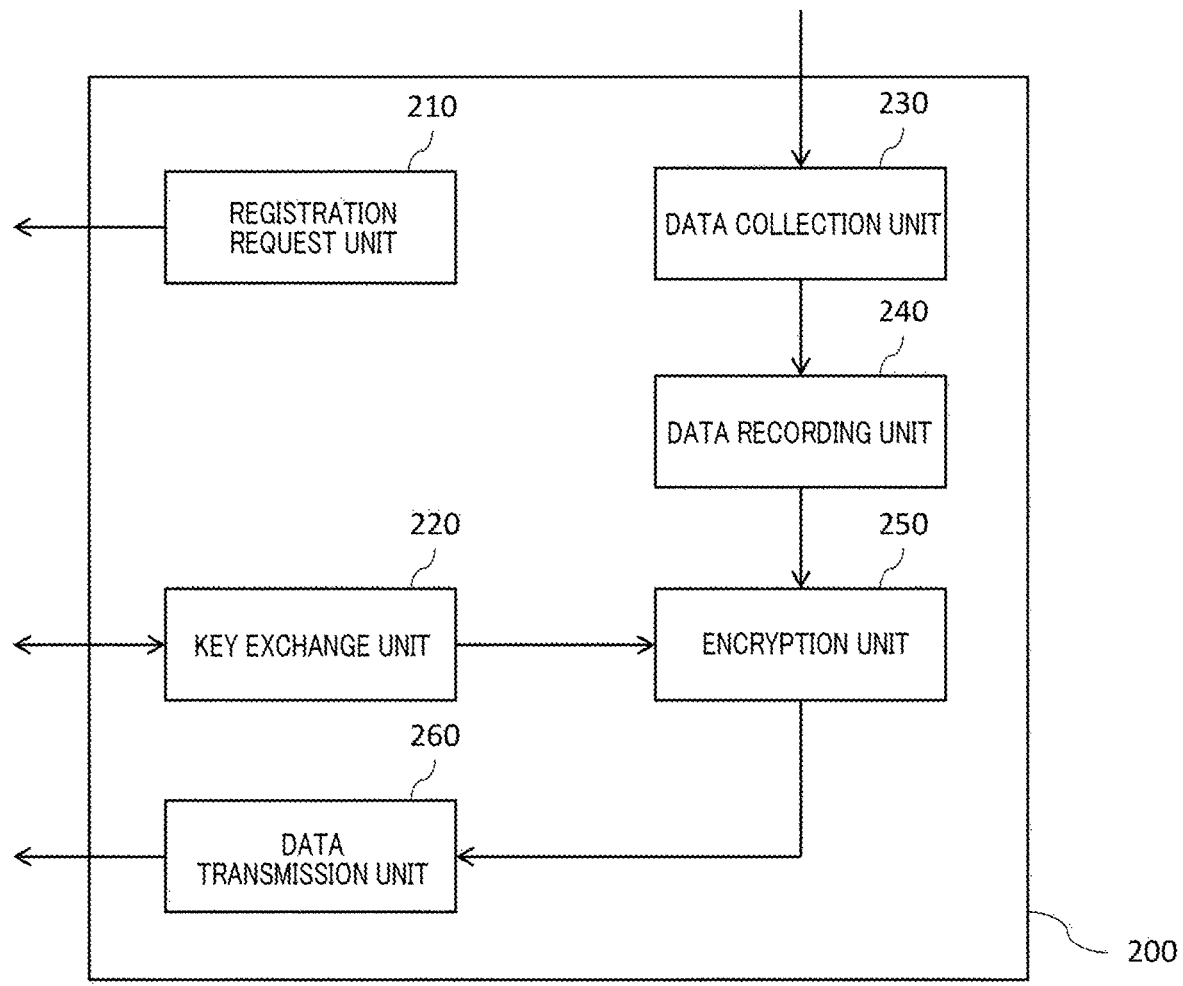
FIG. 2 illustrates one example of a block diagram of the data recording apparatus 200 according to the present embodiment.

FIG. 2 illustrates one example of a block diagram of the data recording apparatus 200 according to the present embodiment. Note that these blocks are functional blocks that are respectively separated in terms of functions, and may not necessarily be consistent with an actual device configuration. That is, even when one block is illustrated in the present drawing, the block may not necessarily be configured by a single device. In addition, even when separate blocks are illustrated in the present drawing, those blocks may not necessarily be configured by separate devices. The data recording apparatus 200 is provided with a registration request unit 210, a key exchange unit 220, a data collection unit 230, a data recording unit 240, an encryption unit 250, and a data transmission unit 260.

For example, the registration request unit 210 transmits a request for registering the data recording apparatus 200 of its own to the system 300 via the communication network 10 by the DLT connection function. At this time, the registration request unit 210 may transmit identification information for identifying the data recording apparatus 200 of its own to the system 300.

The key exchange unit 220 exchanges a first encryption key with the system 300 in response to the authentication of the data recording apparatus 200 of its own by the system 300. As one example, by the security management function, the key exchange unit 220 may exchange the first encryption key with the system 300 by obtaining, from the system 300, a first public key corresponding to a first private key owned by the system 300 using the public key cryptography method.

In addition, the key exchange unit 220 exchanges a second encryption key with the equipment 20 that is capable of obtaining the measurement data. As one example, by the security management function, the key exchange unit 220 may exchange the second encryption key with the equipment 20 by supplying a second public key corresponding to a second private key owned by the data recording apparatus 200 to the equipment 20 by using the public key cryptography method. However, the configuration is not limited thereto. The key exchange unit 220 may exchange the second encryption key with the equipment 20 by directly supplying the first public key obtained from the system 300 to the equipment 20. That is, the second encryption key may be the same as the first encryption key. In this manner, the encryption applied to the measurement data by the data recording apparatus 200 and the equipment 20 can be realized by the same encryption key.

The data collection unit 230 collects the measurement data obtained by measuring the physical quantity associated with the measurement target. As one example, the data collection unit 230 collects the measurement data obtained by measuring the physical quantity associated with the measurement target from the plural pieces of the equipment 20 connected in a wired or wireless manner by an I/O function. For example, in the food cold chain, the data collection unit 230 may obtain environment data such as a temperature, a humidity, and vibration in a surrounding atmosphere of the measurement target (product) during transportation or during storage from the plural pieces of the equipment 20 in a time series manner. Note that, as described above, in a case where the second encryption key is exchanged with the equipment 20, the data collection unit 230 may collect the measurement data encrypted by the equipment 20 using the second encryption key.

The data recording unit 240 records the measurement data. As one example, by the security management function, the data recording apparatus 200 decrypts the measurement data collected by the data collection unit 230 using the second private key corresponding to the second public key. Then, the data recording apparatus 200 executes the AD/DA conversion or data formatting of the measurement data by a data processing function. Then, the data recording unit 240 records the measurement data obtained by decryption and data processing in the database in a time series manner.

The encryption unit 250 encrypts the measurement data. As one example, the encryption unit 250 encrypts the measurement data recorded by the data recording unit 240 in the database in a time series manner using the first public key (that is, the first encryption key).

The data transmission unit 260 transmits the measurement data encrypted using the first encryption key to the system 300. As one example, the data transmission unit 260 transmits the measurement data encrypted by the encryption unit 250 using the first encryption key by the DLT connection function to the system 300 via the communication network 10. At this time, the data transmission unit 260 may transmit the identification information for identifying the data recording apparatus 200 of its own to the system 300 together with the measurement data encrypted using the first encryption key. The system 300 corresponding to a transmission destination of the measurement data manages the above-described measurement data by using the distributed ledger technology.

Figure 3:
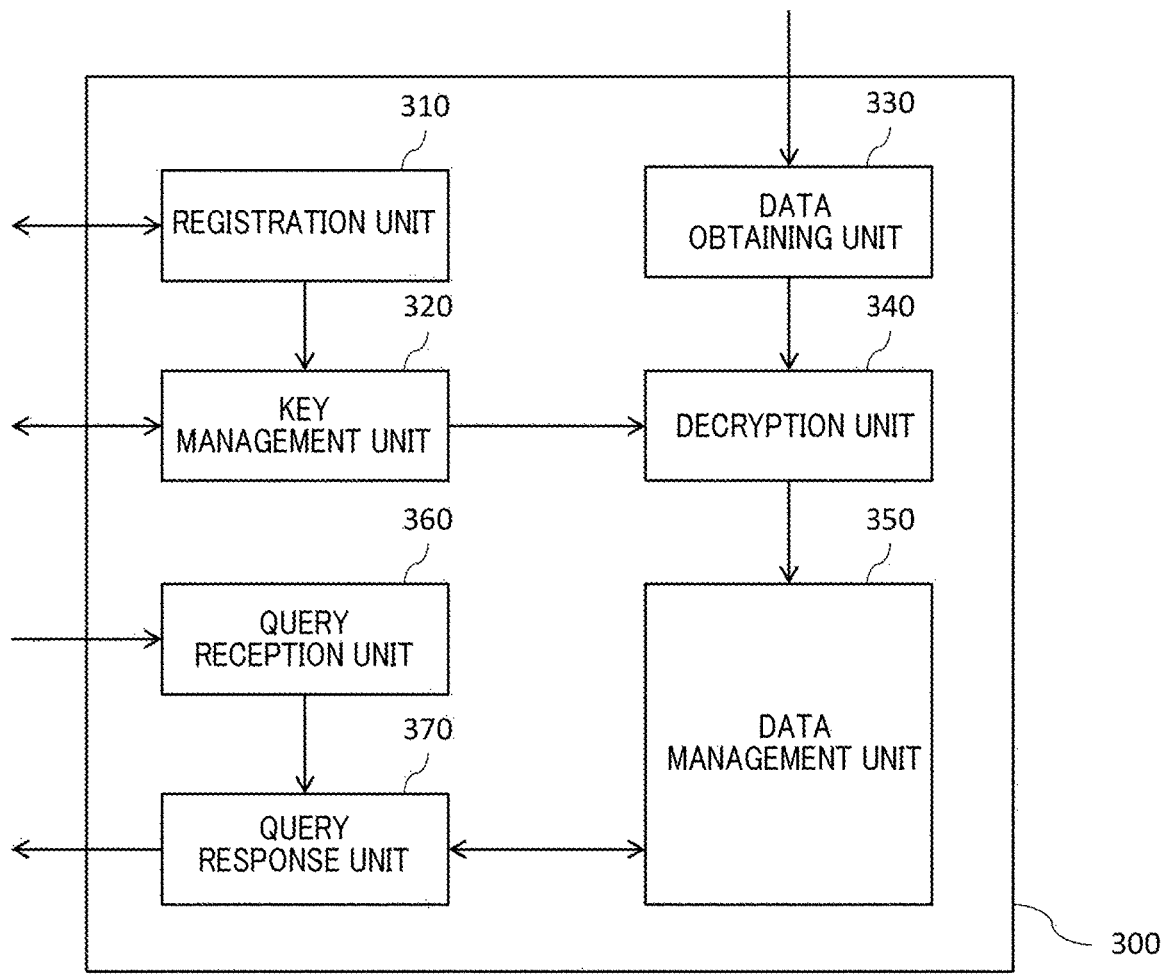
FIG. 3 illustrates one example of a block diagram of the system 300 according to the present embodiment.

FIG. 3 illustrates one example of a block diagram of the system 300 according to the present embodiment. Note that these blocks are functional blocks that are respectively separated in terms of functions, and may not necessarily be consistent with an actual device configuration. That is, even when one block is illustrated in the present drawing, the block may not necessarily be configured by a single device. In addition, even when separate blocks are illustrated in the present drawing, those blocks may not necessarily be configured by separate devices. The system 300 is provided with a registration unit 310, a key management unit 320, a data obtaining unit 330, a decryption unit 340, a data management unit 350, a query reception unit 360, and a query response unit 370.

The registration unit 310 registers the data recording apparatus 200. As one example, the system 300 receives a request for requesting a registration from the data recording apparatus 200 via the communication network 10 by the IoT equipment connection function of the platform. Then, the registration unit 310 authenticates the data recording apparatus 200 that has transmitted the request by the authentication and authorization function of the platform. In addition, the registration unit 310 authorizes a resource access by giving an authorization to the data recording apparatus 200 that has been authenticated by the authentication and authorization function of the platform.

The key management unit 320 exchanges the first encryption key with the data recording apparatus 200 in response to the authentication of the data recording apparatus 200. As one example, the key management unit 320 may exchange the first encryption key with the data recording apparatus 200 by supplying the first public key corresponding to the first private key owned by the system 300 by using the public key cryptography method by the key management function of the platform to the data recording apparatus 200.

The data obtaining unit 330 obtains the measurement data obtained by measuring the physical quantity associated with the measurement target which has been encrypted by the data recording apparatus 200 using the first encryption key. As one example, the data obtaining unit 330 obtains the measurement data encrypted by the data recording apparatus 200 using the first encryption key from the data recording apparatus 200 via the communication network 10 by the IoT equipment connection function of the platform.

The decryption unit 340 decrypts the measurement data obtained by the data obtaining unit 330. As one example, the decryption unit 340 decrypts the measurement data obtained by the data obtaining unit 330 by using the first private key corresponding to the first public key by the cryptographic processing engine of the platform.

The data management unit 350 manages the measurement data decrypted by the decryption unit 340 by using the distributed ledger technology. As one example, the data management unit 350 distributes and holds, and manages the measurement data in the servers or the like that are geographically separated from each other by the database of the platform.

The query reception unit 360 receives a query of the measurement target. As one example, the query reception unit 360 receives the query on the measurement target from the terminal 30 via the communication network 10 by the application for each stakeholder.

The query response unit 370 responds to the query by referring to the measurement data managed using the distributed ledger technology. As one example, the query response unit 370 transmits the response according to the contents of the query to the terminal 30 via the communication network 10 by the application for each stakeholder.

Figure 4:
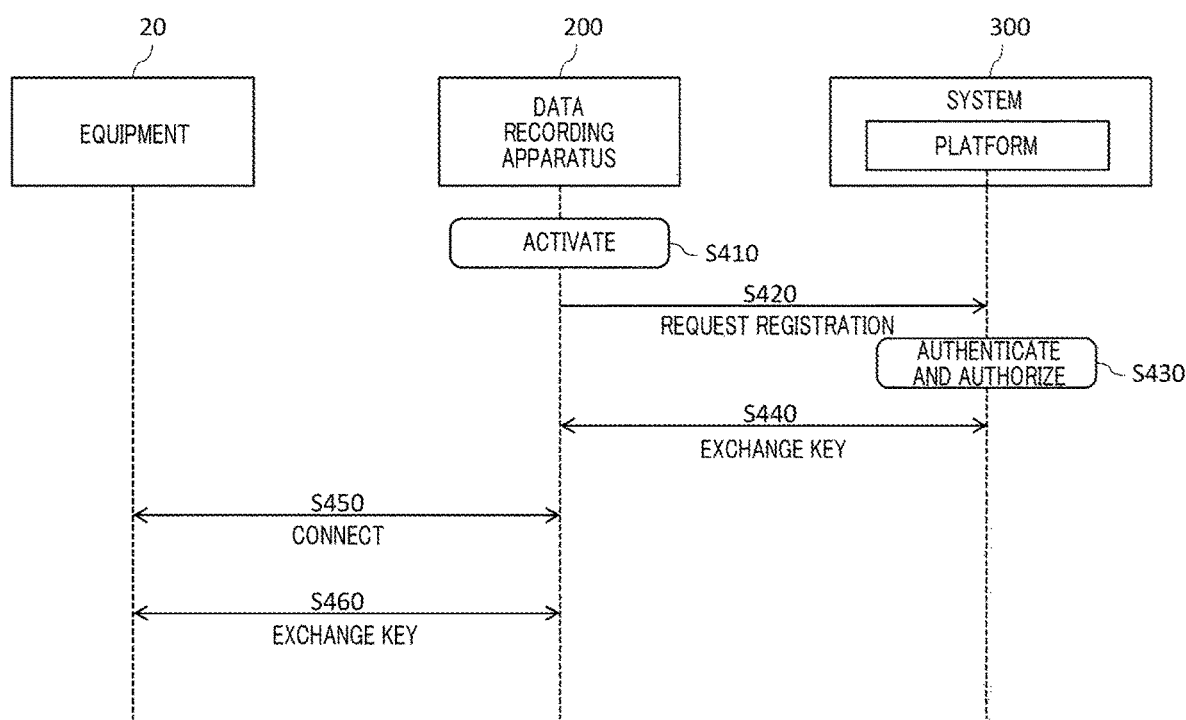
FIG. 4 illustrates one example of a flow for constructing a network by using the data recording apparatus 200 and the system 300 according to the present embodiment.

FIG. 4 illustrates one example of a flow for constructing the network using the data recording apparatus 200 and the system 300 according to the present embodiment. In step 410, for example, in response to press of a power button by the user, the data recording apparatus 200 is activated.

In step 420, the data recording apparatus 200 requests the system 300 to register its own apparatus. As one example, the registration request unit 210 transmits a registration request including the identification information for identifying its own apparatus to the platform of the system 300 via the communication network 10.

In step 430, the platform of the system 300 authenticates and authorizes the data recording apparatus 200. As one example, the registration unit 310 receives the registration request from the data recording apparatus 200 via the communication network 10. Then, the registration unit 310 uniquely identifies the data recording apparatus 200 that has transmitted the registration request based on the identification information included in the registration request, and authenticates the data recording apparatus 200. In addition, the registration unit 310 gives an authorization to the data recording apparatus 200 that has been authenticated, and authorizes the resource access.

In step 440, in response to the authentication of the data recording apparatus 200 by the system 300, the data recording apparatus 200 and the platform of the system 300 exchange the first encryption key. That is, the key exchange unit 220 exchanges the first encryption key with the system 300 in response to the authentication of the data recording apparatus 200 by the system 300. In addition, the key management unit 320 exchanges the first encryption key with the data recording apparatus 200 in response to the authentication of the data recording apparatus 200 by the system 300. As one example, the key management unit 320 may supply the first public key corresponding to the first private key owned by the system 300 by using the public key cryptography method to the data recording apparatus 200, and the key exchange unit 220 may obtain the first public key from the system 300, so that the first encryption key is exchanged therebetween.

In step 450, the data recording apparatus 200 is connected to the equipment 20. At this time, the data recording apparatus 200 may establish the connection with plural pieces of the equipment 20.

In step 460, the second encryption key is exchanged between the data recording apparatus 200 and the equipment 20. That is, the key exchange unit 220 exchanges the second encryption key with the equipment 20 that is capable of obtaining the measurement data. As one example, the key exchange unit 220 may supply the second public key corresponding to the second private key owned by the data recording apparatus 200 by using the public key cryptography method to the equipment 20, and the equipment 20 may obtain the second public key from the data recording apparatus 200, so that the second encryption key is exchanged therebetween. Alternatively, the key exchange unit 220 may directly supply the first public key obtained from the system 300 in step 440 to the equipment 20, and the equipment 20 may obtain the first public key from the data recording apparatus 200, so that the second encryption key is exchanged therebetween. That is, the second encryption key may be the same as the first encryption key.

Figure 5:
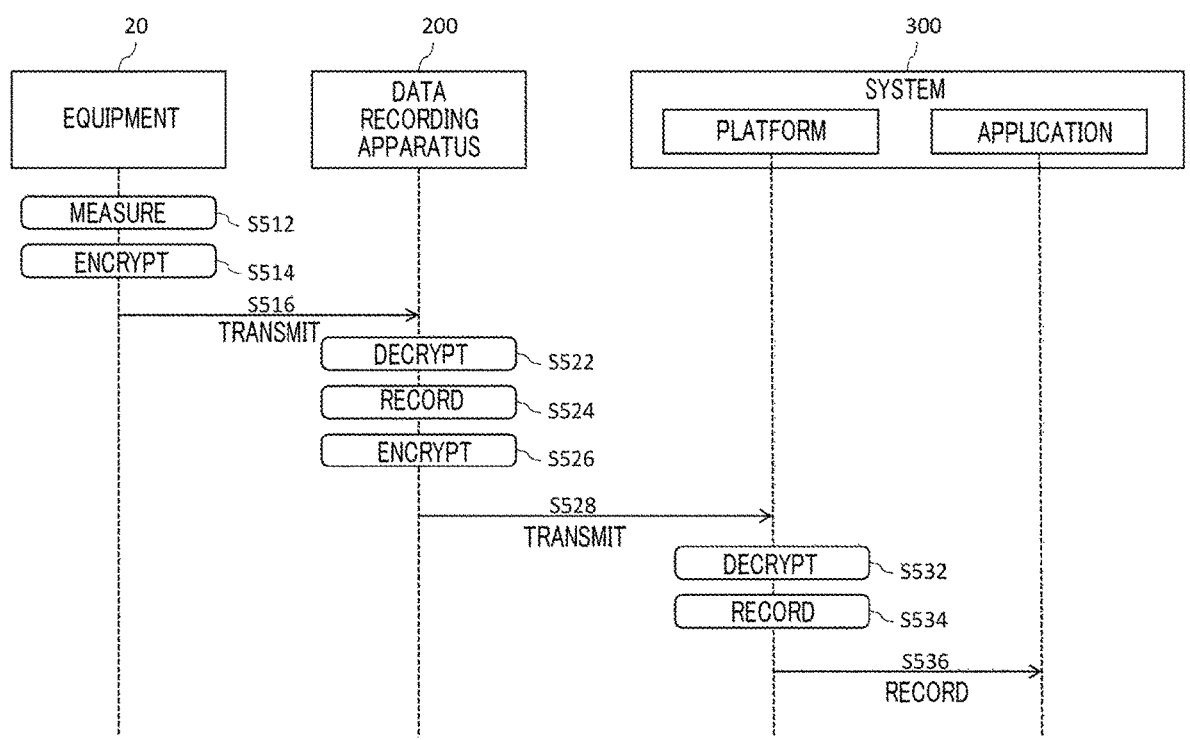
FIG. 5 illustrates one example of a flow for collecting measurement data by using the data recording apparatus 200 and the system 300 according to the present embodiment.

FIG. 5 illustrates one example of a flow for collecting the measurement data using the data recording apparatus 200 and the system 300 according to the present embodiment. In step 512, the equipment 20 measures the physical quantity associated with the measurement target. As one example, the equipment 20 measures environment data such as a temperature, a humidity, and vibration in a surrounding atmosphere of the measurement target (product) during transportation or during storage in the food cold chain.

In step 514, the equipment 20 encrypts the data measured in step 512 by using the second encryption key exchanged with the data recording apparatus 200 in step 460.

Then, in step 516, the equipment 20 transmits the measurement data encrypted using the second encryption key in step 514 to the data recording apparatus 200. In this manner, the data collection unit 230 collects the measurement data obtained by measuring the physical quantity associated with the measurement target, in more details, the measurement data encrypted by the equipment 20 using the second encryption key.

In step 522, the data recording apparatus 200 decrypts the measurement data collected in step 516. As one example, in a case where the equipment 20 encrypts the measurement data using the second public key, the data recording apparatus 200 decrypts the collected measurement data using the second private key. Note that, for example, in a case where the data recording apparatus 200 does not have a private key corresponding to a public key used for the encryption of the measurement data by the equipment 20 or the like, a configuration may be adopted where the data recording apparatus 200 does not decrypt the collected measurement data. That is, the data recording apparatus 200 may skip the processing in step 522.

In step 524, the data recording apparatus 200 records the measurement data decrypted in step 522. As one example, the data recording unit 240 records the measurement data decrypted in step 522 on which the AD/DA conversion or data formatting has been performed in the database in a time series manner.

In step 526, the data recording apparatus 200 encrypts the measurement data recorded in step 524. As one example, the encryption unit 250 encrypts the measurement data recorded by the data recording unit 240 in step 524 by using the first encryption key exchanged with the system 300 in step 440.

In step 528, the data recording apparatus 200 transmits the measurement data encrypted in step 526 to the platform of the system 300. As one example, the data transmission unit 260 transmits the measurement data encrypted by the encryption unit 250 using the first encryption key to the platform of the system 300 via the communication network 10. At this time, the data transmission unit 260 may transmit the identification information for identifying the data recording apparatus 200 of its own to the platform of the system 300 together with the measurement data encrypted using the first encryption key. In this manner, the data obtaining unit 330 obtains the measurement data obtained by measuring the physical quantity associated with the measurement target that has been encrypted by the data recording apparatus 200 using the first encryption key together with the identification information of the data recording apparatus 200 that has transmitted this measurement data.

In step 532, the platform of the system 300 decrypts the measurement data obtained in step 528. As one example, the decryption unit 340 decrypts the measurement data obtained in step 528 by using the first private key.

In step 534, the platform of the system 300 records the measurement data decrypted in step 532 in the database of the DLT. In this manner, the data management unit 350 manages the measurement data decrypted in step 532 by using the distributed ledger technology by the database of the platform.

In step 536, the platform of the system 300 records data to be used for the application among the measurement data recorded in step 534 in the database of the application.

Up to now, it has been known that authenticity and traceability of data may be acquired by using the distributed ledger technology. However, IoT sensors and IoT equipment outside the blockchain, that is, IoT sensors and IoT equipment in a related art do not normally hold security (authenticity and traceability) equivalent to the blockchain. Therefore, no matter how robust and reliable the system of the blockchain may be, this level of security may not be applicable outside the blockchain. In addition, although a stand-alone secure data logger exists, integration with the blockchain has not yet been carried out, and this data logger has not been established as a foundation of trust. In contrast, according to the present embodiment, a novel approach is proposed in which the data logger that can securely record the data is integrated with the DLT/blockchain. In more details, in the present embodiment, the data recording apparatus 200 encrypts the measurement data using the encryption key exchanged with the system 300 in response to the authentication by the system 300 that realizes the DLT platform. In this manner, according to the present embodiment, the authenticity and the traceability of the data can be acquired across the entire system, that is, inside and also outside the blockchain. Therefore, for example, it is possible to increase the transparency of the product quality which has been a black box for consumers.

Figure 6:
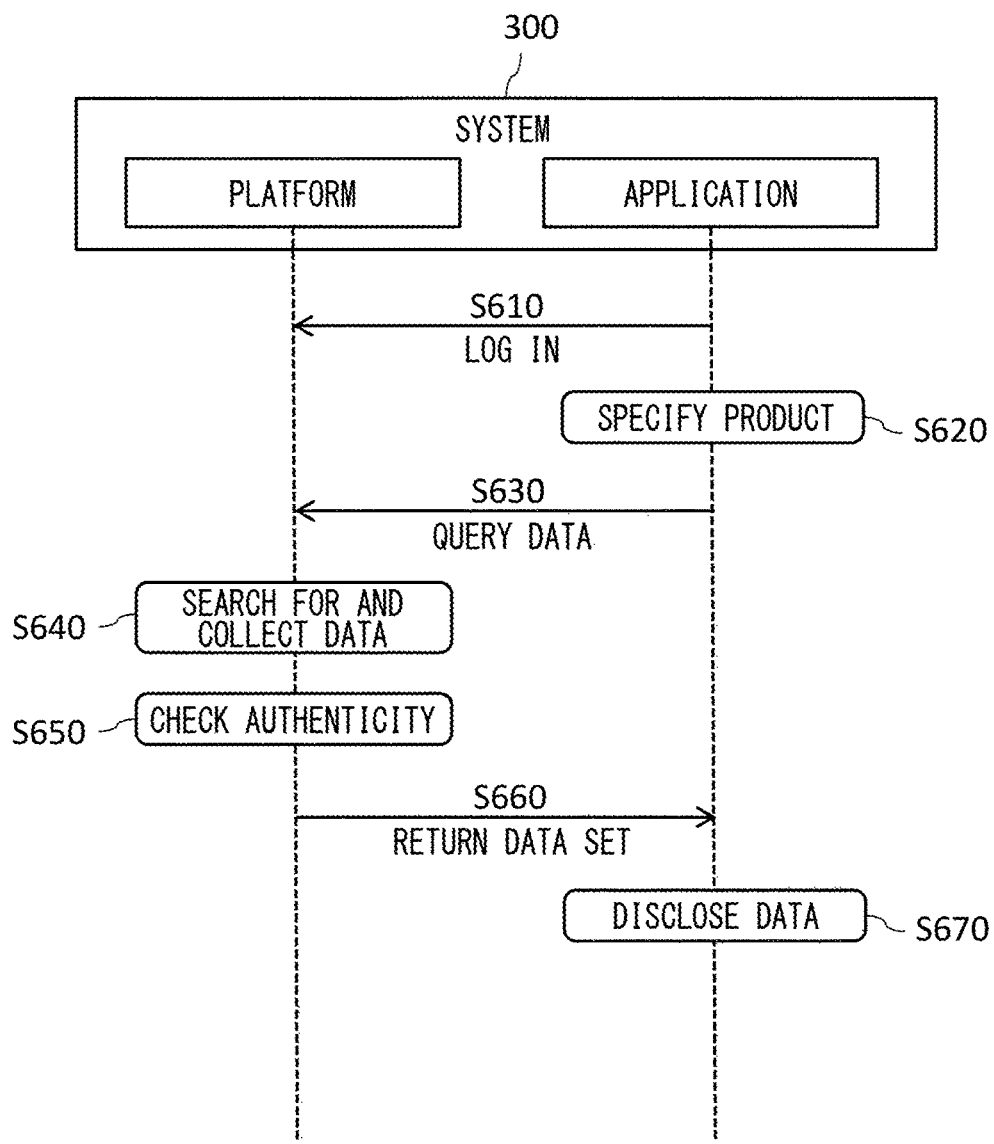
FIG. 6 illustrates one example of a flow for searching for and disclosing the measurement data by using the system 300 according to the present embodiment.

FIG. 6 illustrates one example of a flow for searching for and disclosing the measurement data using the system 300 according to the present embodiment. In step 610, the application of the system 300 logs in to the platform. As one example, the user operates the terminal 30 and accesses the application for each stakeholder via the Web browser or the like operating on the terminal 30. Then, the user inputs a user ID or a password to log in to the platform from the application.

In step 620, the application of the system 300 specifies a product that is set as a target (measurement target). When the product is wine as one example, the user scans a QR code affixed on a bottle of the wine by using the terminal 30. Then, the terminal 30 transmits identification information read by the QR code and also a request for disclosing the measurement data associated with the product to the application. In this manner, the query reception unit 360 receives the query for requesting the disclosure of the measurement data associated with the measurement target from the terminal 30. In this manner, the application of the system 300 specifies the product for which the disclosure of the measurement data has been requested.

In step 630, the application of the system 300 supplies the data related to the query received in step 620 to the platform.

In step 640, the platform of the system 300 makes inquiries to the database of application, the DLT, and the data recording apparatus 200 in response to the supply of the query data from the application in step 630, and searches for and collects the measurement data associated with the specified product.

In step 650, the platform of the system 300 checks, based on the DLT, whether the measurement data collected in step 640 is falsified. At this time, the platform may confirm the authenticity of the data by accessing the data recording apparatus 200.

In step 660, the platform of the system 300 supplies a set of the measurement data in which the authenticity is confirmed in step 650 to the application.

In step 670, the application of the system 300 discloses the set of the measurement data supplied from the platform in step 660. As one example, the query response unit 370 transmits a response including the set of the measurement data supplied from the platform in step 660, that is, the measurement data managed using the distributed ledger technology to the terminal 30.

In this manner, in the system 300, the query reception unit 360 may receive the query regarding the measurement target, and the query response unit 370 may refer to the measurement data managed using the distributed ledger technology, and as one example of a response to the query, transmit a response including the measurement data managed using the distributed ledger technology to the query for requesting the disclosure of the measurement data.

Figure 7:
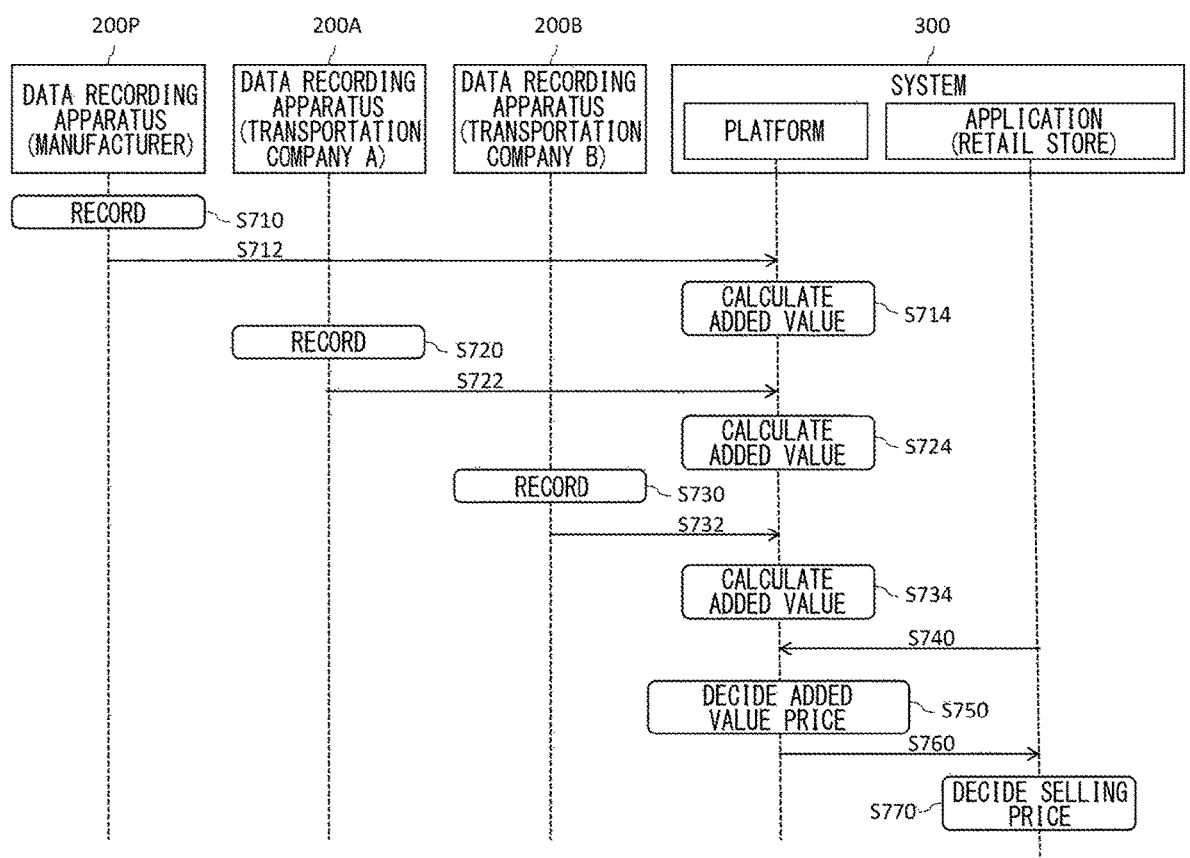
FIG. 7 illustrates one example of a flow for calculating a price by using the data recording apparatus 200 and the system 300 according to the present embodiment.

FIG. 7 illustrates one example of a flow for calculating a price using the data recording apparatus 200 and the system 300 according to the present embodiment. In the present drawing, a case will be described as one example where stakeholders of a manufacturer, a transportation company A, and a transportation company B respectively have a data recording apparatus 200P, a data recording apparatus 200A, and a data recording apparatus 200B (which will be collectively referred to as the data recording apparatus 200 in a case where no distinction is required).

In step 710, the data recording apparatus 200P records the measurement data obtained by measuring the physical quantity associated with the measurement target which has been collected over a period when the measurement target is managed by the manufacturer.

In step 712, the data recording apparatus 200P encrypts the measurement data recorded in step 710 by using the encryption key exchanged with the system 300, and thereafter transmits the encrypted measurement data to the platform of the system 300.

In step 714, the platform of the system 300 records the measurement data transmitted in step 712 in the DLT. At this time, the platform calculates a value to be added to the measurement target according to a predetermined algorithm based on the recorded measurement data. Then, the platform records the calculated added value as a point.

Similarly, in step 720, the data recording apparatus 200A records the measurement data obtained by measuring the physical quantity associated with the measurement target which has been collected over a period when the measurement target is managed by the transportation company A.

In step 722, the data recording apparatus 200A encrypts the measurement data recorded in step 720 by using the encryption key exchanged with the system 300, and thereafter transmits the encrypted measurement data to the platform of the system 300.

In step 724, the platform of the system 300 records the measurement data transmitted in step 722 in the DLT. At this time, the platform calculates a value to be added to the measurement target according to a predetermined algorithm based on the recorded measurement data. Then, the platform records the calculated added value as a point.

Similarly, in step 730, the data recording apparatus 200B records the measurement data obtained by measuring the physical quantity associated with the measurement target which has been collected over a period when the measurement target is managed by the transportation company B.

In step 732, the data recording apparatus 200B encrypts the measurement data recorded in step 730 by using the encryption key exchanged with the system 300, and thereafter transmits the encrypted measurement data to the platform of the system 300.

In step 734, the platform of the system 300 records the measurement data transmitted in step 732 in the DLT. At this time, the platform calculates a value to be added to the measurement target according to a predetermined algorithm based on the recorded measurement data. Then, the platform records the calculated added value as a point.

In step 740, application for the retail store in the system 300 requests the platform to carry out pricing of the added value regarding the specified product (measurement target). As one example, the user operates the terminal 30, and accesses the application for the retail store via the Web browser or the like operating on the terminal 30. Then, the terminal 30 transmits the identification information of the product and also a request regarding an indicator of the added value of the measurement target to the application for the retail store. In this manner, the query reception unit 360 receives, from the terminal 30, the identification information of the product (measurement target) and also the query for requesting the indicator of the value to be added to the measurement target. Then, the application for the retail store supplies the data related to the received query to the platform.

In step 750, the platform of the system 300 decides an added value price according to a predetermined algorithm based on the added value points calculated in step 714, step 724, and step 734.

In step 760, the platform of the system 300 supplies the added value price decided in step 750 to the application for the retail store. Then, the query response unit 370 transmits a response including the added value price decided by the platform, that is, the indicator of the value calculated based on the measurement data managed using the distributed ledger technology to the terminal 30.

In step 770, the retailer decides a selling price of the product based on the added value price supplied in step 760. For example, for Japanese sake with a manufacturers suggested retail price of 2000 Japanese Yen, in a case where the product is expected be able to maintain a high quality since a management state until the product is supplied to the retail store from the manufacturer is satisfactory, the retailer may sell the product at 2100 Yen including the added value of 100 Yen. Alternatively, for Japanese sake with the manufacturers suggested retail price of 2000 Yen, in a case where the product is expected to have a degraded quality since the management state until the product is supplied to the retail store from the manufacturer is dissatisfactory, the retailer may sell the product at a price of 1900 Yen including a discount of 100 Yen. Note that, an actual selling price may be manually decided by the retailer by referring to the added value price, or may be automatically decided based on the added value price.

In this manner, in the system 300, the query reception unit 360 may receive the query regarding the measurement target, and the query response unit 370 may refer to the measurement data managed using the distributed ledger technology, and as one example of a response to the query, transmit a response including the indicator of the value calculated based on the measurement data managed using the distributed ledger technology to the query for requesting the indicator of the value to be added to the measurement target.

Figure 8:
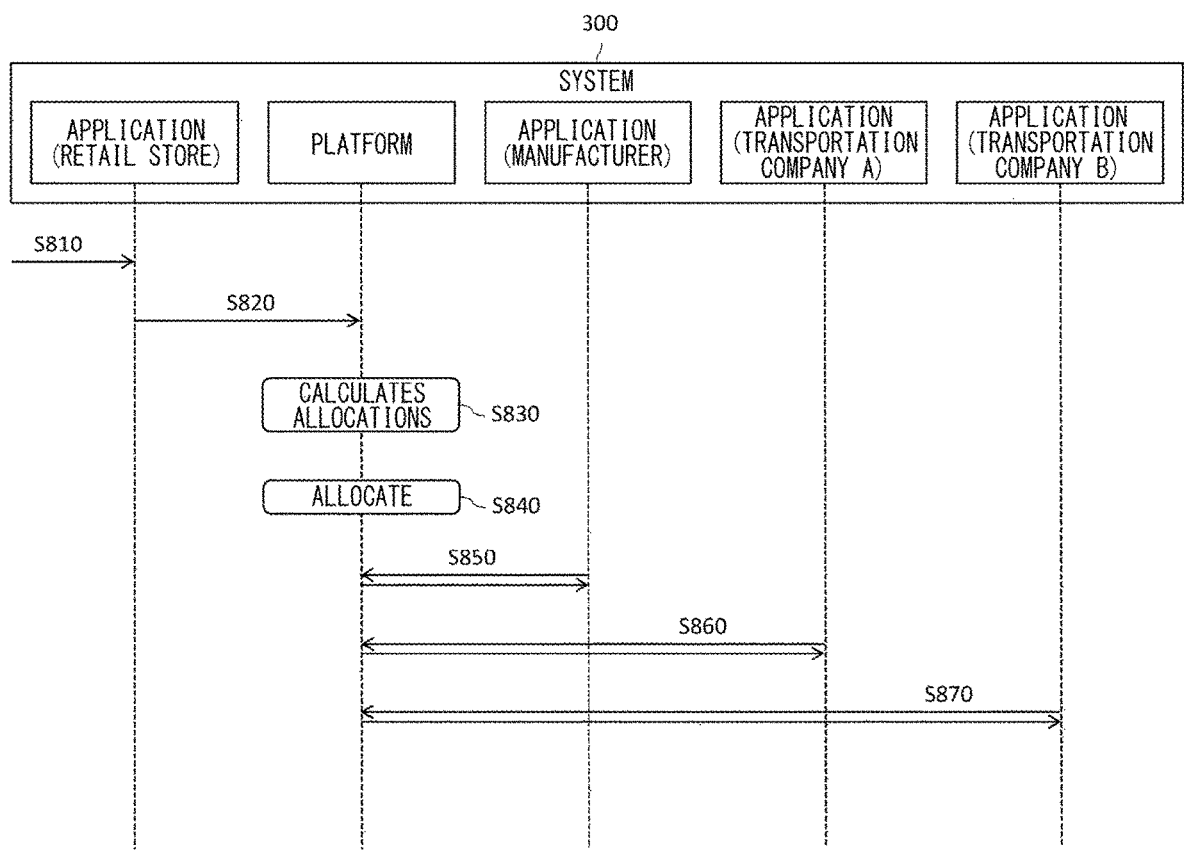
FIG. 8 illustrates one example of a flow for reaching an agreement by using the system 300 according to the present embodiment.

FIG. 8 illustrates one example of a flow for reaching an agreement by using the system 300 according to the present embodiment. In step 810, the application for the retail store recognizes that the consumer has purchased the product from the retailer. The system 300 may determine that an indicator of a consideration to the value added to the purchased product is requested in response to the purchase of the product. That is, the query reception unit 360 may receive a query for requesting the indicator of the consideration to the value added to the measurement target.

In step 820, the application for the retail store registers a transaction of the product in the platform. At this time, the application of the retail store may manually register the transaction of the product via a user input, or may automatically register the transaction of the product by cooperating with a POS system. Note that in a case where the consumer has executed purchase processing of the product through e-commerce (EC), the transaction of the product may be automatically registered in a stage where the product is received by the consumer.

In step 830, the platform of the system 300 respectively calculates allocations of the added value to the respective stakeholders based on the added value points respectively calculated in step 714, step 724, and step 734 for each stakeholder.

In step 840, the platform allocates virtual currencies/tokens to the respective stakeholders based on the allocations of the values added for the respective stakeholders that are respectively calculated in step 830 for each stakeholder.

In step 850 to step 870, each stakeholder may operate the terminal 30, access the application for each stakeholder via the Web browser or the like operating on the terminal 30, and confirm and exchange the allocated virtual currency/token with a real currency (Yen or Dollar) to be withdrawn. That is, the query response unit may transmit the response including the indicator of the consideration calculated based on the measurement data that is managed using the distributed ledger technology.

In this manner, in the system 300, the query reception unit 360 may receive the query regarding the measurement target, and the query response unit 370 may refer to the measurement data managed using the distributed ledger technology, and as one example of a response to the query, transmit a response including the indicator of the consideration calculated based on the measurement data managed using the distributed ledger technology to the query for requesting the indicator of the consideration to the value added to the measurement target.

In this manner, according to the present embodiment, it is possible to provide a token economics mechanism in which the pricing is automatically changed according to the nature or quality of the measurement target or an autonomous price agreement mechanism in which even in the case of the same product, the price of the product in which the temperature deviation occurs is set to be lower than the product in which no temperature deviation occurs. In this manner, according to the present embodiment, it is possible to increase the transparency of the product quality which has been a black box for consumers in the past, and also enable payment of the consideration consistent with the product value. In addition, according to the present embodiment, it is possible to back up the trust on the efforts to maintain the quality by the stakeholders on the supply chain management such as the transportation company by the DLT and the data logger, and assign an appropriate reward to the value.

Various embodiments of the present invention may be described with reference to flowcharts and block diagrams, whose blocks may represent (1) steps of processes in which operations are performed or (2) sections of apparatuses responsible for performing operations. Certain steps and sections may be implemented by at least any one of a dedicated circuitry, a programmable circuitry supplied with computer-readable instructions stored on computer-readable media, and processors supplied with computer-readable instructions stored on computer-readable media. A dedicated circuitry may include digital and/or analog hardware circuits and may include integrated circuits (IC) and/or discrete circuits. A programmable circuitry may include reconfigurable hardware circuits including logical AND, OR, XOR, NAND, NOR, and other logical operations, flip-flops, registers, memory elements such as field-programmable gate arrays (FPGA) and programmable logic arrays (PLA), and the like.

Computer-readable media may include any tangible device that can store instructions for execution by a suitable device, such that the computer-readable medium having instructions stored therein is provided with an article of manufacture including instructions which may be executed to create means for performing operations specified in the flowcharts or block diagrams. Examples of computer-readable media may include an electronic storage medium, a magnetic storage medium, an optical storage medium, an electromagnetic storage medium, a semiconductor storage medium, and the like. More specific examples of computer-readable media may include a Floppy (registered trademark) disk, a diskette, a hard disk, a random access memory (RAM), a read-only memory (ROM), an erasable programmable read-only memory (EPROM or Flash memory (registered trademark)), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), and C++, and conventional procedural programming languages, such as the "C" programming language or similar programming languages.

Computer-readable instructions may be provided to a processor of a general purpose computer, special purpose computer, or other programmable data processing apparatus, or to a programmable circuitry, locally or via a local area network (LAN), wide area network (WAN) such as the Internet, or the like, to execute the computer-readable instructions to create means for performing operations specified in the flowcharts or block diagrams. Examples of processors include computer processors, processing units, microprocessors, digital signal processors, controllers, microcontrollers, and the like.

Figure 9:
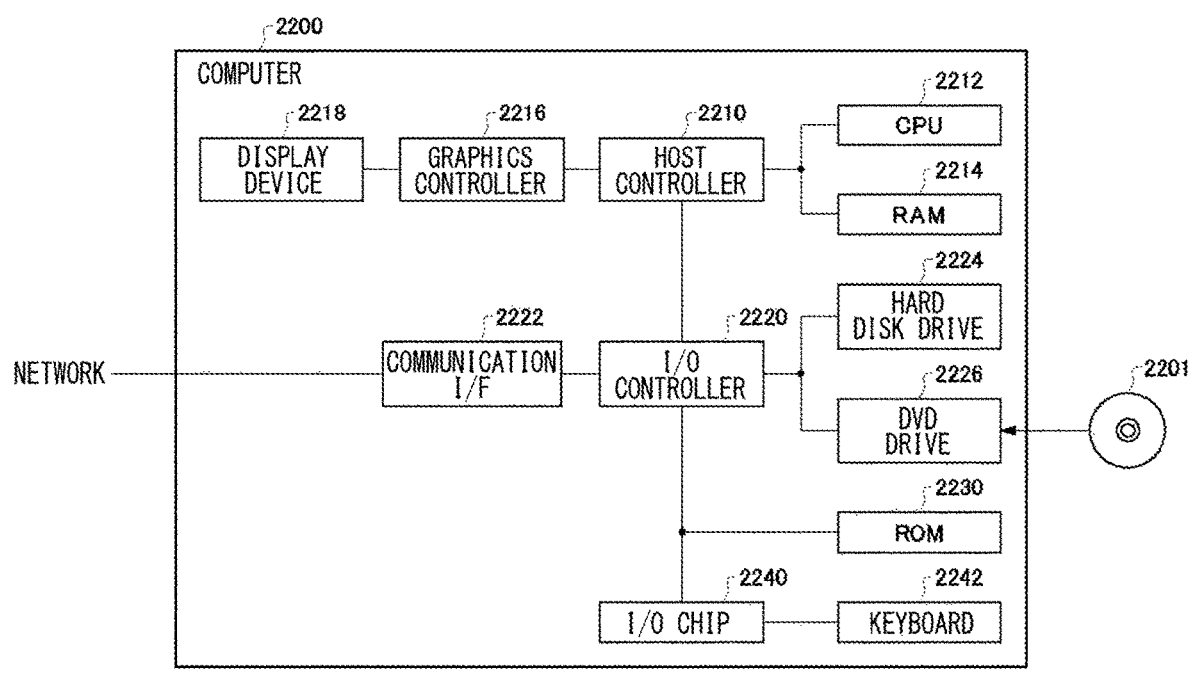
FIG. 9 illustrates an example of a computer 2200 that may embody an entirety of a part of a plurality of aspects of the present invention.

FIG. 9 illustrates an example of a computer 2200 in which a plurality of aspects of the present invention may be wholly or partly embodied. A program that is installed in the computer 2200 can cause the computer 2200 to function as or perform operations associated with apparatuses according to the embodiments of the present invention or one or more sections thereof, and/or cause the computer 2200 to perform processes of the embodiments of the present invention or steps thereof. Such a program may be executed by a CPU 2212 to cause the computer 2200 to perform certain operations associated with some or all of the blocks of flowcharts and block diagrams described herein.

The computer 2200 according to the present embodiment includes the CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 through an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores therein a boot program or the like executed by the computer 2200 at the time of activation, and/or a program depending on the hardware of the computer 2200. The input/output chip 2240 may connect various input/output units via a parallel port, a serial port, a keyboard port, a mouse port, and the like to the input/output controller 2220.

A program is provided by computer-readable media such as the DVD-ROM 2201 or the IC card. The program is read from the computer-readable media, installed into the hard disk drive 2224, RAM 2214, or ROM 2230, which are also examples of computer-readable media, and executed by the CPU 2212. The information processing described in these programs is read into the computer 2200, resulting in cooperation between a program and the above-mentioned various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffering region provided in a recording medium such as the RAM 2214, the hard disk drive 2224, the DVD-ROM 2201, or the IC card, and transmits the read transmission data to a network or writes reception data received from a network to a reception buffering region or the like provided on the recording media.

In addition, the CPU 2212 may cause all or a necessary portion of a file or a database to be read into the RAM 2214, the file or the database having been stored in an external recording medium such as the hard disk drive 2224, the DVD-ROM drive 2226 (DVD-ROM 2201), the IC card, or the like, and perform various types of processing on the data on the RAM 2214. The CPU 2212 then writes back the processed data to the external recording medium.

Various types of information, such as various types of programs, data, tables, and databases, may be stored in the recording medium to undergo information processing. The CPU 2212 may perform various types of processing on the data read from the RAM 2214, including various types of operations, processing of information, condition judging, conditional branch, unconditional branch, search/replace of information, and the like, as described throughout this disclosure and designated by an instruction sequence of programs, and writes the result back to the RAM 2214. In addition, the CPU 2212 may search for information in a file, a database, or the like, in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer-readable media on the computer 2200 or near the computer 2200. In addition, a recording medium such as a hard disk or a RAM provided in a server system connected to a dedicated communication network or the Internet can be used as the computer-readable media, thereby providing the program to the computer 2200 via the network.

While the present invention have been described by way of the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 communication network
20 equipment
30 terminal
200 data recording apparatus
210 registration request unit
220 key exchange unit
230 data collection unit
240 data recording unit
250 encryption unit
260 data transmission unit
300 system
310 registration unit
320 key management unit
330 data obtaining unit
340 decryption unit
350 data management unit
360 query reception unit
370 query response unit
2200 computer
2201 DVD-ROM
2210 host controller
2212 CPU
2214 RAM
2216 graphics controller
2218 display device
2220 input/output controller
2222 communication interface 2224 hard disk drive
2226 DVD-ROM drive
2230 ROM
2240 input/output chip
2242 keyboard

What is claimed is:

1. A system for logging and managing measurement data, the system comprising:
a measurement data management system; and
a data recording apparatus comprising:
a first computer system comprising one or more processors and one or more non-transitory, computer-readable storage media communicating with the one or more processors of the first computer system and storing a first program, wherein:
when the first program is executed by the one or more processors of the first computer system, the first computer system is configured to exchange a first encryption key with the measurement data management system in response to authentication by the measurement data management system;
when the first program is executed by the one or more processors of the first computer system, the first computer system is configured to collect measurement data obtained by measuring a physical quantity associated with a product having a product value, which is impacted by deviation of the physical quantity from a predetermined condition, wherein the physical quantity relates to an external or internal condition of the product;
when the first program is executed by the one or more processors of the first computer system, the first computer system is configured to record the measurement data; and
when the first program is executed by the one or more processors of the first computer system, the first computer system is configured to transmit the measurement data encrypted using the first encryption key to the measurement data management system, wherein
the measurement data management system comprises:
a second computer system comprising one or more processors and one or more non-transitory, computer-readable storage media communicating with the one or more processors of the second computer system and storing a second program, wherein:
when the second program is executed by the one or more processors of the second computer system, the second computer system is configured to exchange the first encryption key with the data recording apparatus in response to authentication of the data recording apparatus;
when the second program is executed by the one or more processors of the second computer system, the second computer system is configured to obtain, from the data recording apparatus, the measurement data, which are encrypted by the data recording apparatus using the first encryption key;
when the second program is executed by the one or more processors of the second computer system, the second computer system is configured to receive a query for requesting an indicator of an added value to be added to the product value; and
when the second program is executed by the one or more processors of the second computer system, the second computer system is configured to transmit, in response to the query, a response including the indicator of the added value calculated by the one or more processors based at least in part on the deviation of the physical quantity from the predetermined condition determined using the measurement data.

2. The system for logging and managing measurement data according to claim 1, wherein:
when the first program is executed by the one or more processors of the first computer system, the first computer system is configured to exchange a second encryption key with equipment that is capable of obtaining the measurement data; and
when the first program is executed by the one or more processors of the first computer system, the first computer system is is configured to collect the measurement data encrypted by the equipment using the second encryption key.

3. The system for logging and managing measurement data according to claim 2, wherein the second encryption key is the same as the first encryption key.

4. The system for logging and managing measurement data according to claim 1, wherein when the first program is executed by the one or more processors of the first computer system, the first computer system is is configured to transmit identification information for identifying its own apparatus to the measurement data management system together with the measurement data encrypted using the first encryption key.

5. The system for logging and managing measurement data according to claim 2, wherein when the first program is executed by the one or more processors of the first computer system, the first computer system is is configured to transmit identification information for identifying its own apparatus to the measurement data management system together with the measurement data encrypted using the first encryption key.

6. The system for logging and managing measurement data according to claim 3, wherein when the first program is executed by the one or more processors of the first computer system, the first computer system is is configured to transmit identification information for identifying its own apparatus to the measurement data management system together with the measurement data encrypted using the first encryption key.

7. The system for logging and managing measurement data according to claim 1, wherein when the second program is executed by the one or more processors of the second computer system, the second computer system is configured to manage the measurement data using a distributed ledger technology, wherein the deviation of the physical quantity from the predetermined condition is determined using the measurement data managed using the distributed ledger technology.

8. The system for logging and managing measurement data according to claim 2, wherein when the second program is executed by the one or more processors of the second computer system, the second computer system is configured to manage the measurement data using a distributed ledger technology, wherein the deviation of the physical quantity from the predetermined condition is determined using the measurement data managed using the distributed ledger technology.

9. The system for logging and managing measurement data according to claim 3, wherein when the second program is executed by the one or more processors of the second computer system, the second computer system is configured to manage the measurement data using a distributed ledger technology, wherein the deviation of the physical quantity from the predetermined condition is determined using the measurement data managed using the distributed ledger technology.

10. A system comprising:
a computer system comprising one or more processors and one or more non-transitory, computer-readable storage media storing a program, wherein:
when the program is executed by the one or more processors, the computer system is configured to exchange a first encryption key with a data recording apparatus in response to authentication of the data recording apparatus;
when the program is executed by the one or more processors, the computer system is configured to obtain, from the data recording apparatus, measurement data, which are encrypted by the data recording apparatus using the first encryption key, obtained by measuring a physical quantity associated with a product having a product value, which is impacted by deviation of the physical quantity from a predetermined condition, wherein the measurement data are collected by the data recording apparatus, and wherein the physical quantity relates to an external or internal condition of the product;
when the program is executed by the one or more processors, the computer system is configured to manage the measurement data using a distributed ledger technology;
when the program is executed by the one or more processors, the computer system is configured to receive a query for requesting an indicator of an added value to be added to the product value; and
when the program is executed by the one or more processors, the computer system is configured to transmit, in response to the query, a response including the indicator of the added value calculated by the one or more processors based at least in part on the deviation of the physical quantity from the predetermined condition determined using the measurement data managed using the distributed ledger technology.

11. The system according to claim 10, wherein:
when the program is executed by the one or more processors, the computer system is configured to receive a query for requesting disclosure of the measurement data associated with the product; and
when the program is executed by the one or more processors, the computer system is configured to transmit a response including the measurement data managed using the distributed ledger technology.

12. The system according to claim 10, wherein:
when the program is executed by the one or more processors, the computer system is configured to receive a query for requesting an indicator of a consideration of the added value added to the product value; and
when the program is executed by the one or more processors, the computer system is configured to transmit a response including the indicator of the consideration calculated based on the measurement data managed using the distributed ledger technology.

13. The system according to claim 11, wherein:
when the program is executed by the one or more processors, the computer system is configured to receive a query for requesting an indicator of a consideration of the added value added to the product value; and
when the program is executed by the one or more processors, the computer system is configured to transmit a response including the indicator of the consideration calculated based on the measurement data managed using the distributed ledger technology.

14. A method comprising:
exchanging a first encryption key with a data recording apparatus in response to authentication of the data recording apparatus;
obtaining, from the data recording apparatus, measurement data, which are encrypted by the data recording apparatus using the first encryption key, the measurement data being obtained by measuring a physical quantity associated with a product having a product value, which is impacted by deviation of the physical quantity from a predetermined condition, wherein the measurement data are collected by the data recording apparatus, and wherein the physical quantity relates to an external or internal condition of the product;
managing the measurement data using a distributed ledger technology; and
transmitting, in response to a query requesting an indicator of an added value to be added to the product value, a response including the indicator of the added value calculated based at least in part on the deviation of the physical quantity from the predetermined condition determined using the measurement data managed using the distributed ledger technology.

15. A non-transitory, computer-readable recording medium having recorded thereon a program for causing, when executed by a computer system comprising one or more processors, the computer system to execute a method comprising:
exchanging a first encryption key with a data recording apparatus in response to authentication of the data recording apparatus;
obtaining, from the data recording apparatus, measurement data, which are encrypted by the data recording apparatus using the first encryption key, the measurement data being obtained by measuring a physical quantity associated with a product having a product value, which is impacted by deviation of the physical quantity from a predetermined condition, wherein the measurement data are collected by the data recording apparatus, and wherein the physical quantity relates to an external or internal condition of the product;
managing the measurement data using a distributed ledger technology; and
transmitting, in response to a query requesting an indicator of an added value to be added to the product value, a response including the indicator of the added value calculated by the one or more processors based at least in part on the deviation of the physical quantity from the predetermined condition determined using the measurement data managed using the distributed ledger technology.

16. The system for logging and managing measurement data according to claim 1, wherein the data recording apparatus further comprises at least one sensor configured to measure the physical quantity.

17. The system for logging and managing measurement data according to claim 16, wherein the at least one sensor comprises one or more sensors selected from an IoT sensor that can measure environment data of surrounding atmosphere of the product, a temperature sensor, a humidity sensor, a vibration sensor, a sheet-type sensor affixed to the product and configured to obtain the environment data of surrounding atmosphere of the product, and a compact sensor embedded in a label, a cap, or a cork of a bottle.

18. The system for logging and managing measurement data according to claim 1, wherein the physical quantity is selected from a group consisting of a temperature, a humidity, a vibration exposure, and an ultraviolet exposure of the product or of an environment of the product.

19. The system for logging and managing measurement data according to claim 1, wherein the physical quantity is one of a plurality of physical quantities associated with the product,
- wherein the plurality of physical quantities are selected from a group consisting of a temperature, a humidity, a vibration exposure, and an ultraviolet exposure of the product or of an environment of the product, and
- wherein the measurement data is obtained by measuring the plurality of physical quantities associated with the product.

20. The system for logging and managing measurement data according to claim 1, wherein the indicator of the added value is calculated by the one or more processors based at least in part on the deviation of the physical quantity from the predetermined condition and a time area during which the deviation has occurred.

* * * * *